(12) United States Patent
Sutherland et al.

(10) Patent No.: US 6,769,007 B2
(45) Date of Patent: Jul. 27, 2004

(54) ADDER CIRCUIT WITH A REGULAR STRUCTURE

(75) Inventors: Ivan E. Sutherland, Santa Monica, CA (US); David L. Harris, Claremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 614 days.

(21) Appl. No.: 09/827,569

(22) Filed: Apr. 5, 2001

(65) Prior Publication Data

US 2002/0174158 A1 Nov. 21, 2002

(51) Int. Cl.[7] .............................................. G06F 7/50
(52) U.S. Cl. ...................................... 708/700; 708/710
(58) Field of Search .............................. 708/670, 700, 708/701, 702, 703, 704, 706, 710–714

(56) References Cited

U.S. PATENT DOCUMENTS

| | | | | |
|---|---|---|---|---|
| 5,122,982 A | * | 6/1992 | Cohn .......................... | 708/710 |
| 5,500,813 A | * | 3/1996 | Song et al. .................. | 708/712 |
| 6,560,625 B1 | * | 5/2003 | Rossignol et al. .......... | 708/710 |

OTHER PUBLICATIONS

Publication, entitled "Computer Arithmetic," by Behrooz Parhami, University of California, Santa Barbara, Oxford University Press 2000, Chapter 6, pp. 91–107.

Publication, entitled "Fine–Grain Pipelined Asynchronous Adders for High–Speed DSP Applications", by Montek Singh et al., Columbia University, IEEE Computer Society Annual Workshop on VLSI, Apr. 27–28, 2000.

Publication, entitled "A Novel Area–Efficient Binary Adder", by S.B. Furber et al., the University of Manchester, Proc. Asilomar Conference on Signals, Systems & Computers, Oct. 29–Nov. 1, 2000.

* cited by examiner

Primary Examiner—Chuong Dinh Ngo
(74) Attorney, Agent, or Firm—Park, Vaughan & Fleming LLP

(57) ABSTRACT

One embodiment of the present invention provides an apparatus for facilitating an addition operation between two N-bit numbers, wherein the apparatus has a regular structure. The apparatus includes a carry circuit for generating at least one carry signal for the addition operation, wherein the carry circuit includes a plurality of logic blocks organized into rows that form approximately logN successive stages of logic blocks. Each of these logic blocks provides current for at most a constant number of inputs in a successive stage of logic blocks. Additionally, within a given stage of logic blocks, outputs from multiple logic blocks are ganged together to drive a signal line that feeds multiple inputs in a successive stage of logic blocks. Furthermore, there are at most a constant number of lateral tracks in a planar layout of signal lines between the successive stages of logic blocks. Hence, the present invention can reduce layout and design effort, while producing a regularized layout that takes up a small amount of space on a semiconductor chip.

21 Claims, 8 Drawing Sheets

First embodiment of carry tree

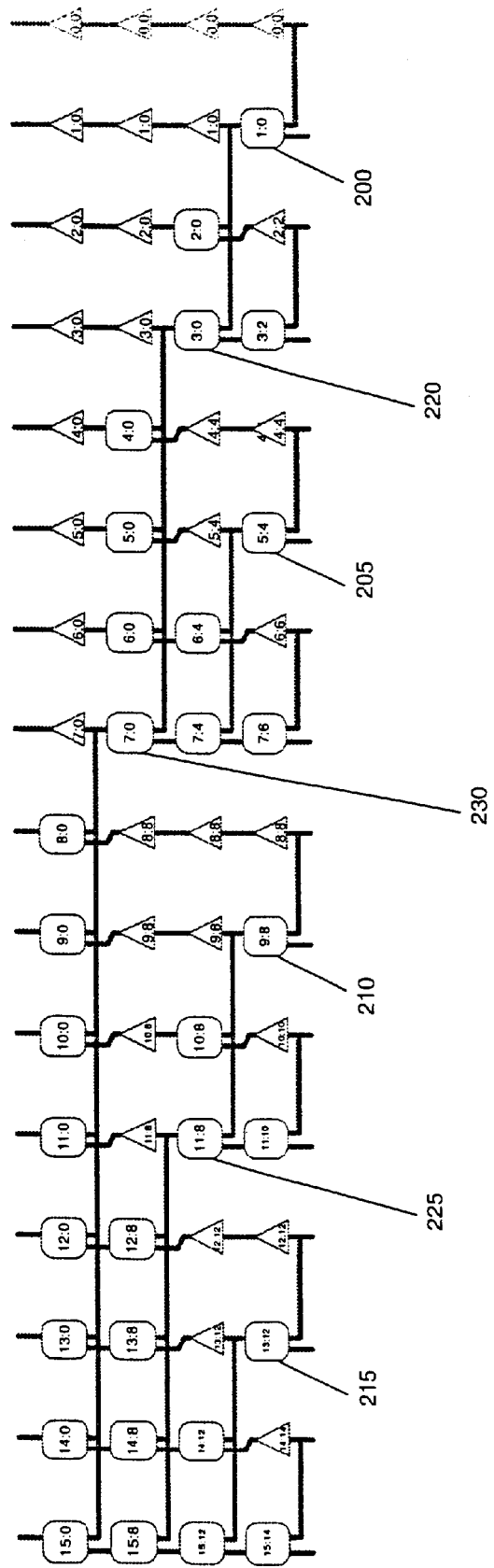
Figure 2: Elementary Prefix Carry Tree (prior art)

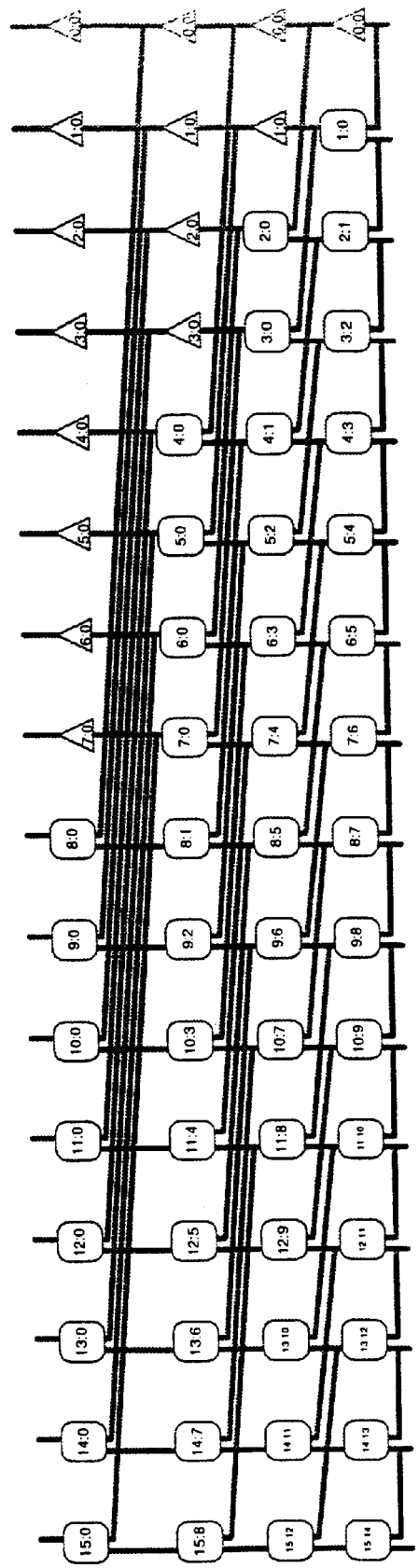
Figure 3: Kogge-Stone Carry Tree (prior art)

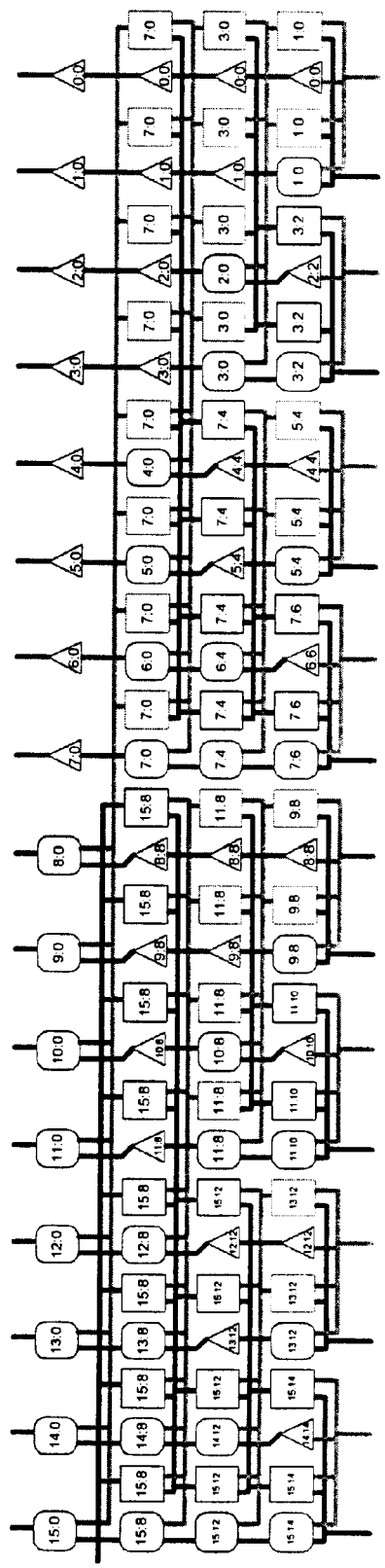
Figure 4: First embodiment of carry tree

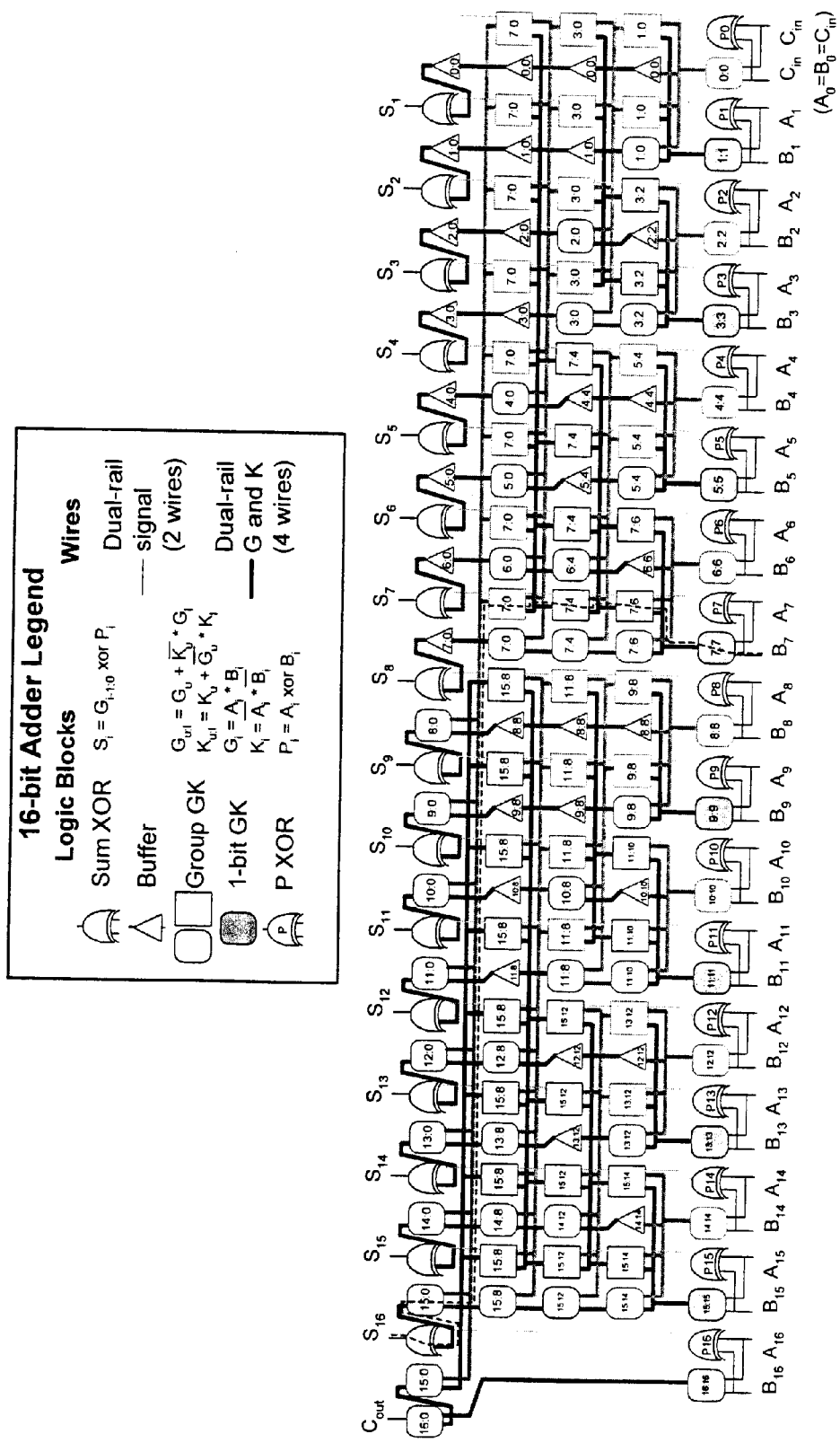
Figure 5: First embodiment of entire 16-b adder

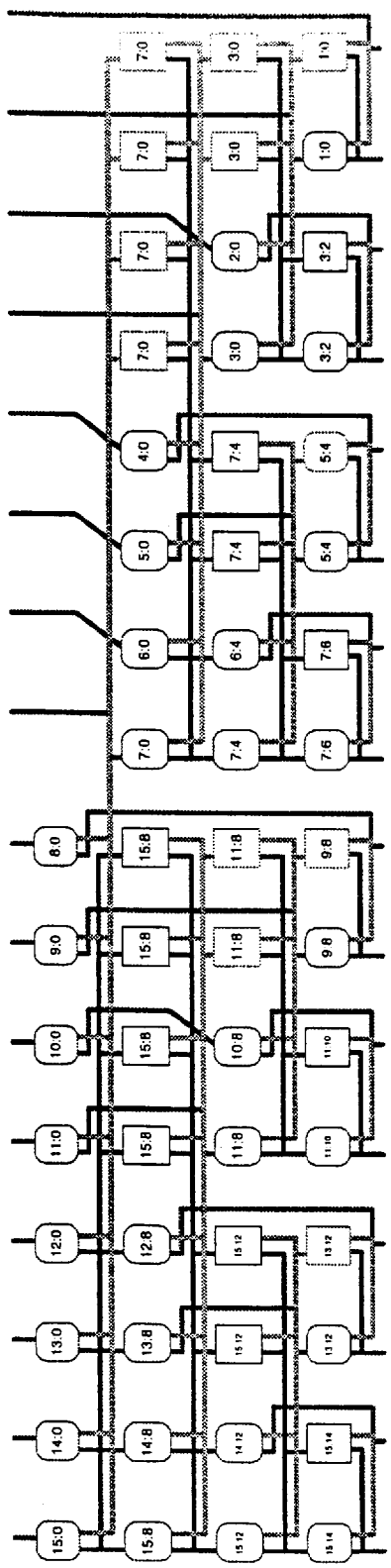
Figure 6: Second embodiment of carry tree

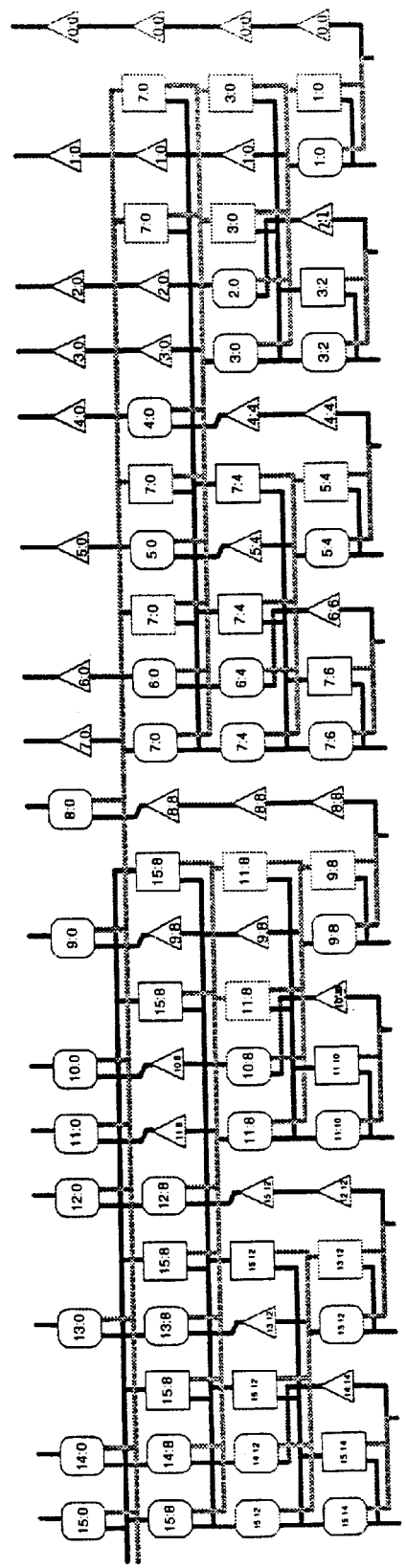
Figure 7: Third embodiment of carry tree

ADDER CIRCUIT WITH A REGULAR STRUCTURE

BACKGROUND

1. Field of the Invention

The present invention relates to digital circuitry for performing an addition operation. More specifically, the present invention relates to a method and an apparatus for performing an addition operation using a carry circuit with a regular structure.

2. Related Art

Binary addition of two n-bit numbers and a carry-in bit involves computing the sum $$s_i = a_i \text{ xor } b_i \text{ xor } c_i \qquad (EQ\ 1)$$

for each bit i ($n \geq i \geq 1$). The inputs $a_i$ and $b_i$ are given, but the carry-in $c_i$ to each bit must be computed based on all of the less significant bits and the carry-in bit (bit 0). Therefore, the fundamental problem of addition is computing the carries for each bit.

There are a multitude of approaches to carry generation offering tradeoffs among speed, area, and ease of layout. Microprocessors generally require maximum speed and thus employ some form of prefix computation to produce all of the carry signals in parallel. Such computations are based on the notion of generate, propagate, and kill (g, p, k) defined for a bit or group of bits. For brevity, we will use the term group, with the understanding that a bit is a group of one. Each group of bits may receive a carry-in signal. We would like to know if the group will produce a carry-out signal. Generate means that the group will produce a carry-out signal independent of whether a carry-in signal arrives. Propagate means the group will produce a carry-out signal if and only if a carry-in signal arrives. Kill means that the group will not produce a carry-out signal even if a carry-in signal arrives.

We define a group with the subscript i:j to span bits i . . . j inclusive ($n \geq i \geq j \geq 0$). A single bit group corresponding to bit i is given the name i:i. We first define g, p, and k for single bit groups in terms of the inputs a and b:

$$g_{i:i} = a_i * b_i \qquad (EQ\ 2)$$

$$p_{i:i} = a_i \text{ xor } b_i \qquad (EQ\ 3)$$

$$k_{i:i} = \text{not}(a_i) * \text{not}(b_i) \qquad (EQ\ 4)$$

We now define g, p, and k for multibit groups recursively in terms of shorter groups spanning bits i:m and (m−1):j ($i \geq m > j$). We define the more significant group i:m to be the top part and the less significant group (m−1):j to be the bottom part. A group generates a carry if the top part of the group generates or if the top part propagates and the bottom part generates. A group propagates a carry if both the top and bottom parts of the group propagate. The group kills the carry if the top part kills or if the top part propagates and the bottom part kills.

$$g_{i:j} = g_{i:m} + p_{i:m} * g_{(m-1):j} \qquad (EQ\ 5)$$

$$p_{i:j} = p_{i:m} * p_{(m-1):j} \qquad (EQ\ 6)$$

$$k_{i:j} = k_{i:m} + p_{i:m} * k_{(m-1):j} \qquad (EQ\ 7)$$

We can consider bit 0 to describe the carry-in signal ($c_{in}$) to the adder. Bit 0 will generate if the adder receives a carry-in and kill otherwise. Therefore, we define the base case:

$$g_0 = c_{in} \qquad (EQ\ 8)$$

$$p_0 = 0 \qquad (EQ\ 9)$$

$$k_0 = \text{not}(c_{in}) \qquad (EQ\ 10)$$

From these equations, we can determine the carry-in to each bit of the adder:

$$c_i = g_{(i-1):0} \qquad (EQ\ 11)$$

In other words, we receive a carry-in signal to the ith bit if and only if the less significant bits of the adder, including $c_{in}$, collectively generate a carry. Observe that for all i, the prefix propagate $p_{i:0}$ is 0 because bit 0 always either generates or kills and a group propagates only if all the bits in the group propagate. Therefore, the generate and kill signals $g_{i:0}$ and $k_{i:0}$ are complementary. This may be useful because CMOS implementations of the final sum XOR gate require true and complementary versions of $c_i$.

In summary, in a prefix adder we perform three operations:

(1) compute the pgk terms for each bit using (EQ 2)–(EQ 4), (EQ 8)–(EQ 10);

(2) compute the carry-in for each bit using (EQ 5)–(EQ 7), (EQ 11); and (3) compute the sum for each bit using an XOR gate using (EQ 1).

Steps 1 and 3 are trivial, so we will focus on step 2. The recursive nature of the group pgk equations leads to circuits in the form of trees.

There are a variety of known trees offering tradeoffs between speed, gate count, and bisection width, i.e. the number of wires crossing the middle of the adder. The Brent-Kung tree is shown in FIG. 1B; an Elementary Prefix tree is shown in FIG. 2; and the Kogge-Stone tree is shown in FIG. 3. In each of these adder tree diagrams, a line indicates a bus carrying the three pgk signals. Rounded rectangles indicate logic blocks performing the logic of (EQ 5)–(EQ 7). Each block is labeled with the index of the group pgk signals it computes. Triangles represent buffers and may be omitted altogether if fine-grained pipelining is not required. The inputs at the bottom of each figure are the single-bit pgk signals produced in step 1. The outputs at the top of each figure are the full prefix pgk signals including $c_i = g_{i-1:0}$ used as the carry-in to the step 3 XOR.

Table 1 compares the three carry trees as a function of the number of bits n. Delay is measured in number of stages; this is an oversimplification because long wires or large fanouts will increase the delay of each stage. The total number of logic blocks is related to the number of transistors in the tree; buffers are not considered. We define fanout as the number of blocks receiving a signal divided by the number of ganged drivers of that signal. These prior art designs all have a single driver for each signal, so the fanout is simply the number of receivers. The lateral tracks row of the table describes the maximum number of busses running between bits of the tree.

TABLE 1

|  | Brent-Kung | Elementary Prefix | Kogge-Stone |
| --- | --- | --- | --- |
| Delay | $2\log_2 n - 2$ | $\log_2 n$ | $\log_2 n$ |
| Logic Blocks | $2n - \log_2 n - 2$ | $(n/2)\log_2 n$ | $(n-1)\log_2 n + 1$ |
| Max Fanout | 3 | $n/2 + 1$ | 2 |
| Lateral Tracks | 2 | 1 | $n/2$ |

The Brent-Kung tree has the worst delay but the fewest number of logic blocks. The Elementary Prefix adder uses fewer levels of logic. Unfortunately, the fanout between levels grows with the number of bits being added. This increases the delay of the adder and requires some cells to use transistors wider than others to drive the greater loads. The irregular widths increase the number of unique cells that must be laid out and verified. The Kogge-Stone adder solves the fanout problem by distributing computations, achieving good delay and constant fanout at the expense of more logic blocks than the Brent-Kung tree. However, the distributed computation leads to a number of lateral tracks that increases with n. These long wires occupy much area and consume more power when driven. All of the trees also involve driving wires of different lengths at different stages. The capacitance and sometimes resistance of the long wires dominates the stage delay and requires larger drivers in some cells, reducing the regularity or performance of the design.

What is needed is a method and an apparatus for performing a fast addition operation with a limited fanout for logic blocks and with a limited number of lateral tracks between successive stages of logical blocks.

SUMMARY

One embodiment of the present invention provides an apparatus for facilitating an addition operation between two N-bit numbers, wherein the apparatus has a regular structure. The apparatus includes a carry circuit for generating at least one carry signal for the addition operation, wherein the carry circuit includes a plurality of logic blocks organized into rows that form approximately logN successive stages of logic blocks. Each of these logic blocks provides current for at most a constant number of inputs in a successive stage of logic blocks. Additionally, within a given stage of logic blocks, outputs from multiple logic blocks are ganged together to drive a signal line that feeds multiple inputs in a successive stage of logic blocks. Furthermore, there are at most a constant number of lateral tracks in a planar layout of signal lines between the successive stages of logic blocks. Hence, the present invention can reduce layout and design effort, while producing a regularized layout that takes up a small amount of space on a semiconductor chip.

Note that this embodiment of the present invention offers the minimal number of stages, like the Kogge-Stone or Elementary Prefix adder, but a constant number of lateral tracks, like the Brent-Kung adder, while preserving constant fanout.

One embodiment of the present invention uses two types of gates within the prefix tree, providing a simple and regular layout.

One embodiment of the present invention additionally includes a plurality of XOR gates coupled to the carry circuit in order to perform the addition operation.

One embodiment of the present invention additionally includes a plurality of buffers located within the successive stages to facilitate pipelining between the successive stages, so that multiple addition operations can flow through the apparatus at the same time.

One embodiment of the present invention additionally includes an asynchronous control mechanism that facilitates an asynchronous transfer of data between successive stages of logic blocks.

In one embodiment of the present invention, outputs of the plurality of logic blocks have drivers of the same size.

In one embodiment of the present invention, there are $(3N/2)\log_2 N-N/2$ logic blocks excluding buffers. In this embodiment, the maximum fanout of any output from a logic block is three, and the maximum number of lateral tracks between the successive stages of logic blocks is two.

In one embodiment of the present invention, there are $N(\log_2 N-1/2)$ logic blocks. In this embodiment, the maximum fanout of any output from a logic block is four, and the maximum number of lateral tracks between the successive stages of logic blocks is two. In a variation on this embodiment, buffers are used to pipeline early results.

In one embodiment of the present invention, bits of the apparatus are folded so that bit N−i is adjacent to bit i in order to reduce resistance caused by long wires.

In one embodiment of the present invention, each logic block generates the following signals: $g\_h_{i:j}=g\_h_{i:m}+g\_h_{(m-1):j}*k\_l_{i:m}$; $g\_l_{i:j}=k\_h_{i:m}+g\_l_{(m-1):j}*g\_l_{i:m}$; $k\_h_{i:j}=k\_h_{i:m}+k\_h_{(m-1):j}*g\_l_{i:m}$; and $k\_l_{i:j}=g\_h_{i:m}+k\_l_{(m-1):j}*k\_l_{i:m}$.

In one embodiment of the present invention, each logic block generates the following signals: $g_{i:j}=g_{i:m}+p_{i:m}*g_{(m-1):j}$; and $p_{i:j}=p_{i:m}*p_{(m-1):j}$; and $k_{i:j}=k_{i:m}+p_{i:m}*k_{(m-1):j}$.

In one embodiment of the present invention, N equals one of, 16, 32, 64 and 128.

In one embodiment of the present invention, the carry circuit has a radix higher than two.

BRIEF DESCRIPTION OF THE FIGURES

FIG. 2 illustrates an Elementary Prefix carry tree.

FIG. 3 illustrates a Kogge-Stone carry tree.

FIG. 4 illustrates a carry tree in accordance with a first embodiment of the present invention.

FIG. 5 illustrates an adder circuit in accordance with the first embodiment of the present invention.

FIG. 6 illustrates a carry tree in accordance with a second embodiment of the present invention.

FIG. 7 illustrates a carry tree in accordance with a third embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1A:
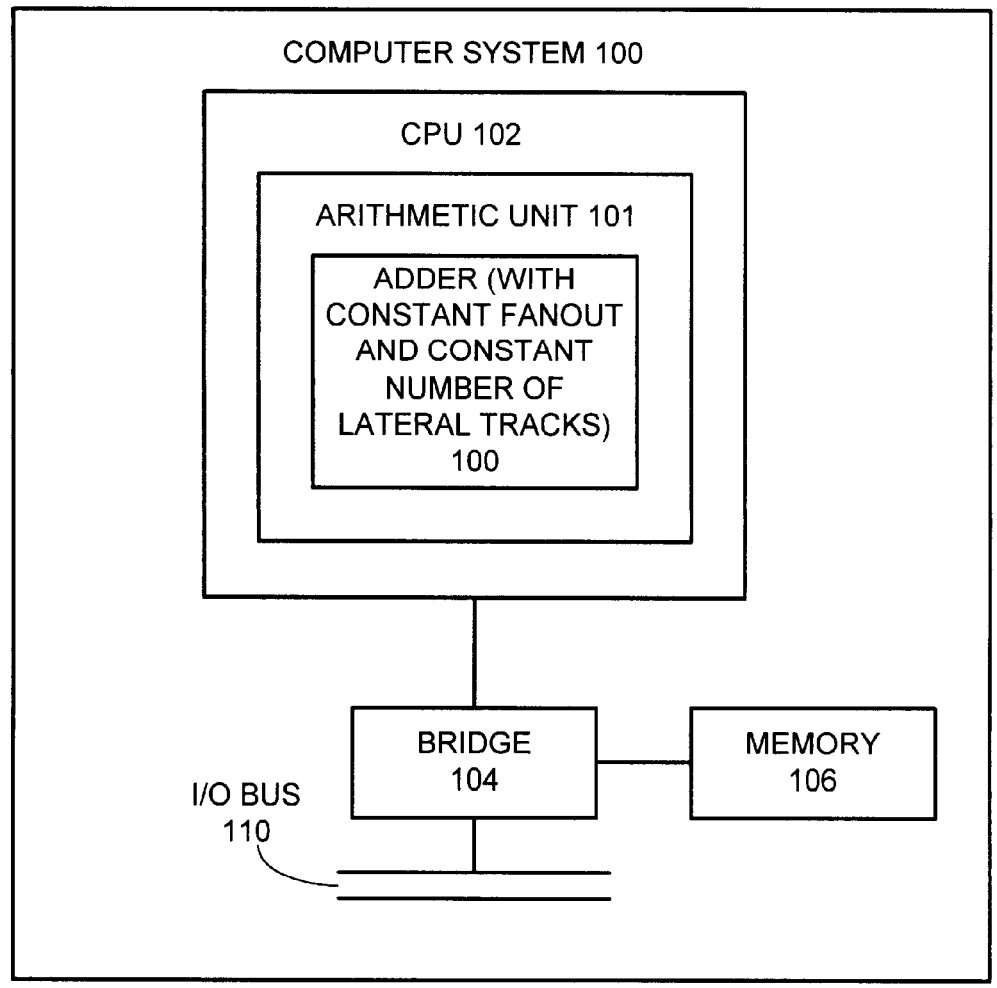
FIG. 1A illustrates a computer system in accordance with an embodiment of the present invention.
Figure 1B:
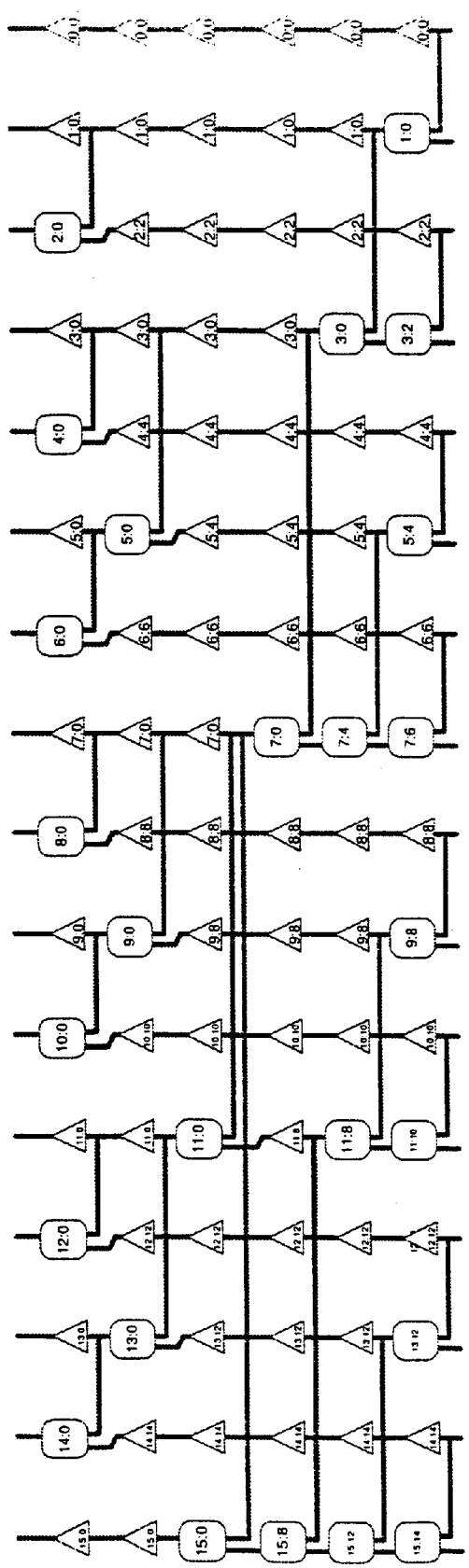
FIG. 1B illustrates a Brent-Kung carry tree.

FIG. 1 illustrates a computer system 100 in accordance with an embodiment of the present invention. Computer system 100 includes central processing unit (CPU) 102, bridge 104 and memory 106. CPU 102 can include any type of computational circuitry, including, but not limited to, a microprocessor, a mainframe computer, a digital signal processor, a personal organizer, a device controller and a computational device within an appliance.

CPU 102 is coupled to memory 106 through bridge 104. Bridge 104 can include any type of circuitry for coupling CPU 102 with other components in computer system 100. Memory 106 can include any type of random access memory that can be used to store code and data for CPU 102. I/O bus 110 can include any type of communication channel for coupling external devices with computer system 100.

CPU 102 includes arithmetic unit 101, which contains special purpose hardware to perform arithmetic operations, such as addition, multiplication and division. In particular, arithmetic unit 101 includes an adder 100 for performing the addition operation. The circuitry in adder 100 has desirable properties, such as a constant fanout and a constant number of lateral tracks between adder stages in accordance with an embodiment of the present invention. Adder circuitry 100 is discussed in more detail below with reference to FIGS. 4–7.

Note that the present invention can generally be used within any type of computing system, and is not limited to the computing system illustrated in FIG. 1.

Carry Trees for Addition Operation

The present invention can be understood in relationship to the Elementary Prefix carry tree. The Elementary Prefix tree of FIG. 2 requires few stages and few wires, but has a large fanout on certain nodes. Specifically, at the bottom row of the tree, blocks 1:0 200, 5:4 205, 9:8 210, and 13:12 215 drive three blocks each. At the next row of the tree, blocks 3:0 220 and 11:8 225 drive five blocks each. At the next row of the tree, block 7:0 230 drives nine blocks. In prior art carry trees, each signal has a single driver. Therefore, the fanout is simply the number of receivers. The fanout problems could be handled by increasing the width of the transistors at the higher levels of the tree driving the large loads, but this leads to irregular layout. We solve the fanout problem instead by supplementing the carry tree with a second tree. This second tree has multiple drivers ganged together in parallel to drive the multiple loads while maintaining a constant fanout. We consider three embodiments of the present invention.

FIG. 4 shows the radix-2 carry tree in accordance with a first embodiment of the present invention. Each bit position now contains two columns of logic. The left column forms an Elementary Prefix tree like that of FIG. 2. Recall that this prefix tree is subject to high fanout. The right columns, distinguished by rectangular icons, form a second tree to compute group gk signals. The first level of the tree has two drivers with outputs ganged together for blocks 1:0, 5:4, 9:8, and 13:12. Six receivers are connected to each pair of drivers, for an overall fanout of three. The second level of the tree has four drivers ganged together for blocks 3:0 and 11:8. These drivers connect to twelve receivers, again for a fanout of three. At each level of the tree, twice as many ganged drivers are available in the right columns to drive the double-sized load, preserving a constant fanout. Note that blocks 3:2, 7:6, etc. drive a lighter fanout of two rather than three.

This embodiment has a delay of $\log_2$ n stages. (3n/2) $\log_2 n - n$ logic blocks are required, excluding buffers. The maximum fanout of any gate is three. The maximum number of lateral tracks is two. Long wires are driven with multiple ganged drivers, providing the current to switch the large wire capacitance while maintaining a regular layout. We see that the desirable combination of low delay and constant fanout and bisection width come at the expense of more logic elements. These elements are small and are all the same size, whereas the elements in FIG. 2 may be larger and irregular in size.

FIG. 5 shows a complete 16-bit adder that adds $A_{16 \ldots 1}$ and $B_{16 \ldots 1}$ to produce $S_{16 \ldots 1}$. This adder supports optional carry-in and carry-out signals. An initial XOR gate precomputes $p_i = a_i \text{ xor } b_i$. This propagate signal is driven to the final sum logic, but is used nowhere else in the carry tree as indicated by the thin dotted line. Simultaneously, the one-bit gk signals are computed. The carry tree computes the carry-in for each bit. This is combined with $p_i$ in the top row to compute the final sum. The dashed line indicates the critical path through the adder. A small amount of initial logic is required to handle $c_{in}$ and $c_{out}$ if they are desired. This layout is extremely regular, requiring only AND-OR, AND, XOR, and buffer functions. The P and Sum XOR gates may use different layouts for maximum performance, but nevertheless only five unique cells must be drawn and verified. Buffers are not shown on the dotted lines, but may be desirable for pipelining.

FIG. 6 shows a second embodiment of the invention. The embodiment is again based on the Elementary Prefix tree of FIG. 2. This embodiment replaces the buffers with a second tree of ganged drivers. This is less expensive in terms of logic blocks than adding the entire second tree in parallel with the original design. This embodiment also demonstrates tying outputs of the two trees together to further reduce effective fanout. This same optimization is applicable to the embodiment of FIGS. 4 and 5.

This second embodiment has a delay of $\log_2$ n stages and requires $n(\log_2 n - 1/2)$ logic blocks and two lateral tracks between stages. The maximum fanout of any gate is less than 4. Long, heavily capacitive wires have ganged drivers. Overall, this embodiment has lower area than the first embodiment. However, it omits buffers for results that are computed early. It also requires slightly irregular vertical wiring tracks for the busses that would have been buffered in the Elementary Prefix carry tree.

FIG. 7 shows a third embodiment of the invention. It modifies the embodiment of FIG. 6 to incorporate buffers for early results to facilitate pipelining with a single gate per stage. It includes 1.5n columns, representing a middle ground between the first embodiment that requires 2n columns and the second that requires n columns. The stage count, number of logic blocks and lateral tracks, and fanout of the third embodiment are the same as of the second embodiment, but more area is required for the buffers.

Note that for layout reasons, one might group multiple circuits into a single column. Hence, the number of columns described in each embodiment is provided merely to aid understanding, and is not necessarily indicative of a physical implementation.

For large adders, e.g. n>32, the resistive delay of the long wires in the adder may become significant even though the capacitance is adequately driven. In such cases, it is possible to "fold" the adder. In one case, we fold like a slice of bread in which bit n−i is placed adjacent to bit i. In another case, we interchange the position of drivers. For example, in FIG. 4, we could interchange the upper four elements computing the 7:0 block with the lower four elements computing the 15:8 block. Hence, the maximum distance and resistance from 7:0 driver to the loads using the signal are reduced at the expense of more lateral tracks.

Alternative Carry Equations

So far we have discussed computing the carry-in signal to each block from p, g, and k in (EQ 5)–(EQ 7). The g and k computation involves AND-OR gates, while the p involves an AND gate. The top propagate signal $P_{i:m}$ is particularly heavily loaded as it is used in AND terms of all three equations.

It is also possible to avoid propagate signals by computing the carries from g, k, and their complements. This is attractive because only AND-OR gates are required, reducing the number of unique cells to design, and also because signals drive at most two terms in each block. Let us define these signals as g_h, g_l, k_h, and k_l, where the _h version of the signal is asserted when the signal is true and the _1 version is asserted when the signal is false. The equations are:

$$g\_h_{i:j} = g\_h_{i:m} + g\_h_{m-1:j} * k\_l_{i:m} \quad \text{(EQ 12)}$$

$$g\_l_{ij} = k\_h_{i:m} + g\_l_{m-1:j} * g\_l_{i:m} \quad \text{(EQ 13)}$$

$$k\_h_{i:j} = k\_h_{i:m} + k\_h_{m-1:j} * g\_l_{i:m} \quad \text{(EQ 14)}$$

$$k\_l_{ij} = g\_h_{i:m} + k\_l_{m-1:j} * k\_l_{i:m} \quad \text{(EQ 15)}$$

The first equation states that we generate from a large block if we generate in the top part of the block or we generate in the bottom part and fail to kill that carry-in the top part. Similarly, we don't generate a carry if we kill in the top part or we fail to generate in the bottom part and also fail to generate in the top part. Observe the symmetry among the equations. They are particularly well suited to dual-rail domino implementation. Moreover, $c_i = g\_h_{i:0} = k\_l_{i:0}$ and $c_j = k\_h_{i:0} = g\_l_{i:0}$, signals may be used to drive the final XOR that requires true and complementary carry values in dual-rail domino. This is in contrast to the pgk formulation in which the logical effort spent to compute $p_{i:0}$ is never used to drive the final output.

Yet another carry equation form uses only the true version of g and the complementary version of k, as given below. A block generates a carry if the top part does not kill and either part generates. A block does not kill the carry if the upper part does not kill and either the upper part generates or the lower part does not kill. It is well-suited to static CMOS implementation because it minimizes the number of gates and wires required in each logic block.

$$g\_h_{i:j} = k\_l_{i:m}(g\_h_{i:m} + g\_h_{m-1:j}) \quad \text{(EQ 16)}$$

$$k\_l_{i:j} = k\_l_{i:m}(g\_h_{i:m} + k\_l_{m-1:j}) \quad \text{(EQ 17)}$$

Of course it is also possible to write equations using the true version of k and the complementary version of g.

Higher Radix

The embodiments have been shown in radix-2 form using true and complementary G and K signals. It is well-known in the art that higher radix adders can be built using the same principles and prefix tree organizations as radix-2 adders. A higher radix design combines more blocks at each level, permitting a critical path with fewer stages. For example, the true and complementary generate and kill signals from three groups may be combined as follows ($n \geq i \geq p > q > j \geq 0$).

$$G_{i:j}\_h = G_{i:p}\_h + K_{i:p}\_l * (G_{(p-1):q}\_h + K_{(p-1):q}\_l * G_{(q-1):j}\_h) \quad \text{(EQ 18)}$$

$$G_{i:j}\_l = K_{i:p}\_h + G_{i:p}\_l * (K_{(p-1):q}\_h + G_{(p-1):q}\_l * G_{(q-1):j}\_l) \quad \text{(EQ 19)}$$

$$K_{i:j}\_h = K_{i:p}\_h + G_{i:p}\_l * (K_{(p-1):q}\_h + G_{(p-1):q}\_l * K_{(q-1):j}\_h) \quad \text{(EQ 20)}$$

$$K_{i:j}\_l = G_{i:p}\_h + K_{i:p}\_l * (G_{(p-1):q}\_h + K_{(p-1):q}\_l * K_{(q-1):j}\_l) \quad \text{(EQ 21)}$$

A drawback of higher radix designs is that each stage is more complex and hence slower. The best choice of radix depends on the specific implementation technology.

Mixed radix design may also be employed. For example, the initial stages might use a higher radix to reduce the overall number of stages. In such mixed radix designs, the number of stages is approximately log N.

Pipelining Concerns

In some implementation technologies such as monotonic domino, very fine-grained pipelining can be performed with a single gate in each pipeline stage to achieve extremely high throughput. In such cases, logic must be "levelized" so that there is exactly one gate in each row or level of the pipeline. Therefore, buffers are required even when no computation takes place. This impacts the layout of some carry trees. In other technologies such as static CMOS, pipelining is performed with latches and no buffers are required.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus for facilitating an addition operation between two N-bit numbers, wherein the apparatus has a regular structure, comprising:

a carry circuit for generating at least one carry signal for the addition operation, wherein the carry circuit includes a plurality of logic blocks organized into rows that form approximately logN successive stages of logic blocks, wherein each logic block generates the following signals:

$$g\_h_{i:j} = g\_h_{i:m} + g\_h_{(m-1):j} * k\_l_{i:m},$$

$$g\_l_{i:j} = k\_h_{i:m} + g\_l_{(m-1):j} * g\_l_{i:m};$$

$$k\_h_{i:j} = k\_h_{i:m} + k\_h_{(m-1):j} * g\_l_{i:m}, \text{and}$$

$$k\_l_{i:j} = g\_h_{i:m} + k\_l_{(m-1):j} * k\_l_{i:m};$$

wherein each logic block provide drive for at most a constant number of inputs in a successive stage of logic blocks, wherein the constant number of inputs is independent of N;

wherein within a given stage of logic blocks, outputs from multiple logic blocks are ganged together to drive a signal line that feeds multiple inputs in a successive stage of logic blocks; and wherein there are at most a constant number of lateral tracks in a planar layout of signal lines between the successive stages of logic blocks, wherein the constant number of lateral tracks is independent of N.

2. The apparatus of claim 1, further comprising a plurality of XOR gates coupled to the carry circuit so as to perform the addition operation.

3. The apparatus of claim 1, further comprising a plurality of buffers located within the successive stages to facilitate pipelining between the successive stages, so that multiple addition operations can flow through the apparatus at the same time.

4. The apparatus of claim 3, further comprising an asynchronous control mechanism that facilitates an asynchronous transfer of data between successive stages of logic blocks.

5. The apparatus of claim 1, wherein outputs of the plurality of logic blocks have drivers of the same size.

6. The apparatus of claim 1,
wherein there are $(3N/2)\log_2 N - N/2$ logic blocks excluding buffers;
wherein the maximum fanout of any output from a logic block is three; and
wherein the maximum number of lateral tracks between the successive stages of logic blocks is two.

7. The apparatus of claim 1,
wherein there are $N(\log_2 N - 1/2)$ logic blocks;
wherein the maximum fanout of any output from a logic block is four; and wherein the maximum number of lateral tracks between the successive stages of logic blocks is two.

8. The apparatus of claim 7, wherein buffers are used to pipeline early results.

9. The apparatus of claim 1, wherein bits of the apparatus are folded so that bit N−i is adjacent to bit i in order to reduce resistance caused by long wires.

10. The apparatus of claim 1, wherein N equals one of, 16, 32, 64 and 128.

11. The apparatus of claim 1, wherein the carry circuit has a radix higher than two.

12. A computer system including a mechanism for facilitating an addition operation between two N-bit numbers, comprising:

a processor;

a memory;

an arithmetic unit within the processor;

a carry circuit within the arithmetic unit for generating at least one carry signal for the addition operation, wherein the carry circuit includes a plurality of logic blocks organized into rows that form approximately logN successive stages of logic blocks, wherein each logic block generates the following signals:

$$g\_h_{i:j} = g\_h_{i:m} + g\_h_{(m-1):j} * k\_l_{i:m},$$

$$g\_l_{i:j} = k\_h_{i:m} + g\_l_{(m-1):j} * g\_l_{i:m};$$

$$k\_h_{i:j} = k\_h_{i:m} + k\_h_{(m-1):j} * g\_l_{i:m},$$

and $$k\_l_{i:j} = g\_h_{i:m} + k\_l_{(m-1):j} * k\_l_{i:m};$$

wherein each logic block provides current for at most a constant number of inputs in a successive stage of logic blocks, wherein the constant number of inputs is independent of N;

wherein within a given stage of logic blocks, outputs from multiple logic blocks are ganged together to drive a signal line that feeds multiple inputs in a successive stage of logic blocks; and wherein there are at most a constant number of lateral tracks in a planar layout of signal lines between the successive stages of logic blocks, wherein the constant number of lateral tracks is independent of N.

13. An apparatus for facilitating an addition operation between two N-bit numbers, comprising:

a carry circuit for generating at least one carry signal for the addition operation, wherein the carry circuit includes a plurality of logic blocks organized into rows that form approximately logN successive stages of logic blocks, wherein each logic block generates the following signals:

$$g\_h_{i:j} = g\_h_{i:m} + g\_h_{(m-1):j} * k\_l_{i:m},$$

$$g\_l_{i:j} = k\_h_{i:m} + g\_l_{(m-1):j} * g\_l_{i:m};$$

$$k\_h_{i:j} = k\_h_{i:m} + k\_h_{(m-1):j} * g\_l_{i:m},$$

and $$k\_l_{i:j} = g\_h_{i:m} + k\_l_{(m-1):j} * k\_l_{i:m};$$

wherein within a given stage of logic blocks, outputs from multiple logic blocks of the same size are ganged together to drive a signal line that feeds multiple inputs in a successive stage of logic blocks;

wherein outputs of the plurality of logic blocks have drivers of the same size;

wherein there are at most a constant number of lateral tracks in a planar layout of signal lines between the successive stages of logic blocks, wherein the constant number of lateral tracks is independent of N; and a plurality of XOR gates coupled to the carry circuit so as to perform the addition operation.

14. The apparatus of claim 13, further comprising a plurality of buffers located within the successive stages to facilitate pipelining between the successive stages, so that multiple addition operations can flow through the apparatus at the same time.

15. The apparatus of claim 13, further comprising an asynchronous control mechanism that facilitates an asynchronous transfer of data between successive stages of logic blocks.

16. The apparatus of claim 13, wherein there are $(3N/2)\log_2 N - N/2$ logic blocks excluding buffers;

wherein the maximum fanout of any output from a logic block is three; and wherein the maximum number of lateral tracks between the successive stages of logic blocks is two.

17. The apparatus of claim 13, wherein there are $N(\log_2 N - 1/2)$ logic blocks;

wherein the maximum fanout of any output from a logic block is four; and wherein the maximum number of lateral tracks between the successive stages of logic blocks is two.

18. The apparatus of claim 17, wherein buffers are used to pipeline early results.

19. The apparatus of claim 13, wherein bits of the apparatus are folded so that bit N−i is adjacent to bit i in order to reduce resistance caused by long wires.

20. The apparatus of claim 13, wherein N equals one of, 16, 32, 64 and 128.

21. The apparatus of claim 13, wherein the carry circuit has a radix higher than two.

* * * * *